United States Patent [19]
Kadota et al.

[11] Patent Number: 6,029,622
[45] Date of Patent: Feb. 29, 2000

[54] FUEL CONTROL METHOD AND SYSTEM FOR CYLINDER INJECTION TYPE INTERNAL COMBUSTION ENGINE

[75] Inventors: Yoichi Kadota, Tokyo; Kazutoshi Noma, Shiga, both of Japan

[73] Assignees: Mitsubishi Denki Kabushiki Kaisha; Mitsubishi Jidosha Kogyo Kabushiki Kaisha, both of Tokyo, Japan

[21] Appl. No.: 09/134,002

[22] Filed: Aug. 14, 1998

[30] Foreign Application Priority Data

Aug. 29, 1997 [JP] Japan ................................. 9-234662

[51] Int. Cl.[7] .................................................. F02B 17/00
[52] U.S. Cl. ................ 123/295; 123/568.21; 123/568.26
[58] Field of Search .............................. 123/295, 568.21, 123/568.26, 430

[56] References Cited

U.S. PATENT DOCUMENTS

| | | | |
|---|---|---|---|
| 4,856,473 | 8/1989 | Kawai et al. | 123/308 |
| 5,322,043 | 6/1994 | Shriner et al. | 123/295 |
| 5,623,904 | 4/1997 | Matsumoto | 123/339.23 |
| 5,749,334 | 5/1998 | Oda et al. | 123/305 |
| 5,896,839 | 4/1999 | Togai | 123/295 |
| 5,904,128 | 5/1999 | Shimada et al. | 123/295 |
| 5,904,129 | 5/1999 | Kadota | 123/406.45 |

FOREIGN PATENT DOCUMENTS 4-187819 7/1992 Japan .
269416 10/1995 Japan .

*Primary Examiner*—John Kwon
*Attorney, Agent, or Firm*—Sughrue, Mion, Zinn, Macpeak & Seas, PLLC

[57] ABSTRACT

A fuel control system for a cylinder injection type internal combustion engine which allows the fuel injection mode to make transition from a compression-stroke injection mode for realizing a high air-fuel ratio to the suction-stroke injection mode for realizing a low air-fuel ratio while ensuring stable combustion state without need for additional provision of any especial devices. The system includes an intake air flow sensor for detecting an intake air flow, a crank angle sensor for detecting rotation speed or rpm of the engine and a crank angle, a fuel injector for injecting fuel directly into each of cylinders of the engine, an exhaust gas recirculation system for regulating quantity of exhaust gas recirculated from an exhaust passageway to an intake passageway of the engine, and an electronic control unit for arithmetically determining control quantities for the fuel injector and the exhaust gas recirculation system, respectively, on the basis of detection information derived from the outputs of the intake air flow sensor and the crank angle sensor, respectively. When the fuel injection mode of the internal combustion engine is changed over from the compression-stroke fuel injection mode to the suction-stroke fuel injection mode, the electronic control unit starts to control the exhaust gas recirculation in precedence to any other control required for the suction-stroke fuel injection mode.

14 Claims, 8 Drawing Sheets

FUEL CONTROL METHOD AND SYSTEM FOR CYLINDER INJECTION TYPE INTERNAL COMBUSTION ENGINE

BACKGROUND OF THE INVENTION

1. Field of the Invention

The present invention relates generally to fuel control method and system for a cylinder injection type (or direct injection type) internal combustion engine for a motor vehicle in which fuel is injected directly into engine cylinders. More particularly, the present invention is concerned with fuel control method and system for the cylinder injection type internal combustion engine equipped with an exhaust gas recirculation system (EGR system for short) in which a fuel injection control mode (hereinafter also referred to simply as the injection mode) can be changed over from a mode in which fuel injection is performed during a compression stroke of the engine for realizing a high air-fuel ratio (hereinafter referred to as the compression-stroke fuel injection mode) to a mode in which fuel injection is performed during a suction stroke of the engine for realizing a low air-fuel ratio (hereinafter referred to as the suction-stroke fuel injection mode) while ensuring improved combustion performance of the engine softwarewise by resorting to correspondingly improved control procedure without need for additional provision of especial hardware component(s) to this end.

2. Description of Related Art

For having better understanding of the principle underlying the invention, technical background thereof will be described in some detail. FIG. 4 is a schematic diagram showing a conventional fuel control system for an internal combustion engine in which a fuel injector is installed within an intake passageway or manifold (mounted outside of the cylinder).

Referring to FIG. 4, an internal combustion engine (hereinafter also referred to simply as the engine) for a motor vehicle is generally denoted by a reference numeral 1.

The engine 1 is equipped with an intake passageway in which an intake air flow sensor 2 is installed at a position upstream of the engine for measuring the air flow (an amount of intake air) Qa fed to the engine 1.

Further mounted within the intake passageway is a throttle valve 3 which is operatively coupled to an accelerator pedal (not shown) adapted to be manipulated by a driver of the motor vehicle and which serves for regulating the air flow supplied to the engine 1 in dependence on the depression stroke of the accelerator pedal.

For the purpose of detecting the angular position of the throttle valve 3 as a throttle opening degree $\alpha$, a throttle opening degree sensor 4 (which may also be referred to as the throttle valve position sensor) is provided in association with the throttle valve 3.

Provided in association with a crank shaft of the engine 1 is a crank angle sensor 5 for detecting a rotation speed (rpm) of the engine 1 as well as a rotational position or angular position of the crank shaft. Thus, the crank angle sensor 5 generates a crank angle signal SGT as the output signal thereof from which information concerning the rotation speed (rpm) of the engine 1 as well as the information concerning the angular position of the crank shaft can be derived.

Temperature Tw of cooling water for the engine 1 is detected by a water temperature sensor 6 which thus can serve as a means for detecting warmed-up state of the engine 1.

An O2-sensor 7 is provided in association with an exhaust passageway of the engine 1 for detecting an oxygen concentration or content Do (corresponding to the air-fuel ratio) of the exhaust gas discharged from the engine 1.

An electronic control unit (also referred to as ECU for short) 8 is provided for arithmetically determining various control quantities in dependence on the operation states of the engine 1. The ECU 8 constitutes a major part of an engine control system and serves for deciding the operating states of the engine 1 on the basis of detection signals outputted from the various sensors installed in the engine at relevant locations. The ECU unit 8 is designed to generate a control signal in dependence on the operation state of the engine for realizing combustion of air-fuel mixture at a desired air-fuel ratio.

A spark plug 9 is installed within the combustion chamber of each of the engine cylinders and undergoes conventional ignition control.

As can be seen in FIG. 4, provided in parallel to the intake passageway across the throttle valve 3 is a bypass passage which an air bypass valve 10 is installed for selectively opening or closing the bypass passage. Thus, it is possible to control the engine rotation number or engine speed (rpm) even when the throttle valve 3 is fully closed (i.e., even when the engine operates in the idling mode).

Further, the air bypass valve 10 can be used for the engine torque control in the running state of the motor vehicle.

A fuel injector 11 is mounted within the intake passageway at a position upstream of the engine 1 for injecting the fuel within the intake passageway.

Further, in order to control the amount of the exhaust gas to be recirculated (also referred to as the exhaust gas recirculation or EGR quantity) into the combustion chamber of the engine 1 with a view to reducing the content of nitrogen oxides or NOx carried by the exhaust gas, there is provided an EGR control system a part of which is constituted by an EGR valve 12.

A cylinder identifying sensor 13 is provided in association with a cam shaft interlinked to the crank shaft to serve for outputting a cylinder identifying signal SGC for identifying discriminatively the cylinder within which the combustion takes place.

The detection signals Qa, $\alpha$, SGT, Tw, Do and SGC derived from the outputs of the intake air flow sensor 2, the throttle opening degree sensor 4, the crank angle sensor 5, the water temperature sensor 6, the O2-sensor 7 and the cylinder identifying sensor 13, respectively, are inputted to the ECU unit 8 as the information indicative of the operating state of the engine 1.

On the other hand, the various components such as the spark plug 9, the air bypass valve 10, the fuel injector 11 and the EGR valve 12 are driven in response to control signals P, B, J and G, respectively, which represent correspondingly the control quantities determined arithmetically by the ECU unit 8.

As can be seen in FIG. 4, in the fuel control system of the conventional internal combustion engines known heretofore, the fuel injector 11 is mounted within the intake passageway of the engine 1. In recent years, however, the cylinder injection type fuel control system (also known as the direct injection type fuel control system) which allows the fuel to be directly injected into the engine cylinder has been developed.

Since the cylinder injection type fuel control system can promise advantageous and profitable effects such as mentioned below, the cylinder injection type fuel control system is very attractive as the ideal fuel injection control system for the engine of a motor vehicle.

(1) Reduction of the content of harmful gases contained in the exhaust gas

In general, in the indirect fuel injection type internal combustion engine in which the fuel is injected externally of the cylinder, a part of fuel as injected is likely to be deposited on the intake valve and wall of the intake passageway. For this reason, it is necessary to take into consideration the amount of fuel likely to be deposited before charging the fuel into the cylinder, particularly when the engine is started from a low-temperature state where the fuel is difficult to vaporize or when the engine is in a transient operation mode in which fuel supply has to be changed at a relatively high rate. By contrast, in the case of the cylinder injection type internal combustion engine, the air-fuel ratio can be increased so that the air-fuel mixture becomes lean without taking into consideration the delay involved in the transportation of the fuel, whereby contents of harmful HC (hydro carbon) gas and CO (carbon monoxide) gas carried by the exhaust gas can be reduced.

(2) Reduction of fuel cost

In the cylinder injection type internal combustion engine, the fuel is injected immediately before the ignition timing, whereby there is formed a mass of combustible fuel mixture around the spark plug 9 at the time of ignition. In other words, the gas mixture containing the fuel is distributed nonuniformly. Thus, the fuel-air mixture undergoes a so-called stratified combustion. Consequently, the air-fuel ratio in appearance between the amount of air and that of the fuel charged into the engine cylinder can be significantly increased, which means that the air-fuel mixture can be made remarkably lean.

Besides, owing to the realization of the stratified combustion, combustion of the air-fuel mixture is scarcely affected adversely even when the exhaust gas is recirculated with an increased ratio. By virtue of this feature and additionally the reduction of pumping loss, the fuel-cost performance of the engine can be enhanced significantly.

(3) Realization of high output power of the engine

Owing to the stratified combustion of the air-fuel mixture concentrated around the spark plug 9, the amount of end gas (i.e., the air-fuel mixture gas in the regions located remotely from the spark plug 9) decreases, which is favorable to the improvement of the anti-knocking performance of the engine. Thus, the compression ratio of the internal combustion engine can be increased.

Furthermore, because the fuel is converted into gas or gasified within the cylinder, the intake air is deprived of heat as vaporization heat. Consequently, the density of the intake air can be increased with the volumetric efficiency being enhanced, which in turn promises high output of the engine.

(4) Enhancement of drivability

By virtue of the direct fuel injection into the cylinder in the cylinder injection type engine system, the time lag intervening between the fuel injection and the generation of output torque by the engine is short when compared with the cylinder injection type engine system.

Thus, there can be realized the internal combustion engine system which is capable of responding speedily to the demand of the driver.

Now, description will be made of a conventional cylinder injection type internal combustion engine system for having better understanding of the invention. FIG. 5 is a schematic diagram showing generally a structure of a conventional fuel control system for a cylinder injection type internal combustion engine such as described in Japanese Unexamined Patent Application Publication No. 187819/1992 (JP-A-4-187819). In the figure, components like as or equivalent to those described hereinbefore by reference to FIG. 4 are designated by like reference characters and repeated description in detail of these components is omitted.

In the cylinder injection type internal combustion engine system, measures for improving the combustion performance of the internal combustion engine is incorporated in the engine itself.

Referring to FIG. 5, a fuel injector 11 is mounted within a cylinder of the engine 1 at high pressure side.

A fuel injector driver 14 is interposed between the ECU 8 and the fuel injector 11 to drive the fuel injector 11 at high speed and high pressure in response to a control signal J issued by the ECU unit 8.

At this juncture, comparison of the cylinder injection type internal combustion engine shown in FIG. 5 with that described hereinbefore by reference to FIG. 4 shows that the former differs structurally from the latter in that the fuel injector 11 for supplying the fuel is not mounted within the intake manifold but installed within the cylinder (i.e., in the combustion chamber) of the engine 1.

Parenthetically, in the case of the fuel control system for the cylinder injection type engine, the fuel injector 11 is implemented with high-speed/high-pressure specifications so that the fuel can be injected into the cylinder with high pressure within a short preceding time period in the suction stroke and the compression stroke. Thus, the fuel control system shown in FIG. 5 also differs from the system shown in FIG. 4 in that the injector driver 14 for driving the fuel injector 11 is additionally provided.

Next, operation of the conventional fuel control system for the cylinder injection type internal combustion engine shown in FIG. 5 will be elucidated by reference to a timing chart shown in FIG. 6 and a flow chart illustrated in FIG. 7 together with FIG. 8 showing relevant control data structure.

FIG. 6 is a timing chart for illustrating changeover of fuel injection mode M between a compression-stroke injection mode MA (i.e., mode in which the fuel is injected directly in the cylinder during the compression stroke) and a suction-stroke injection mode MB (i.e., mode is which the fuel is injected during suction stroke) together with changes in the air-fuel ratio A/F, fuel injection timing Tj of the fuel injector 11, ignition timing Tp of the spark plug 9, EGR quantity Qg and the intake air flow or quantity Qa, respectively, which take place upon changeover of the fuel injection mode M. In FIG. 6, the compression-stroke injection mode MA is validated for the combustion of excessively lean air-fuel mixture while the suction-stroke injection mode MB is validated for the combustion of enriched air-fuel mixture.

The fuel injection mode M is changed over from the compression-stroke injection mode MA to the suction-stroke injection mode MB at a time point t1. Further, at a time point t2, the fuel injection timing Tj and the ignition timing Tp are changed over to the timings for the suction stroke injection mode to the timings for the compression-stroke injection mode. The air-fuel ratio A/F becomes stable at a time point t3. The air-fuel ratio in the compression-stroke injection mode MA is represented by A/FA with the air-fuel ratio in the suction-stroke injection mode MB being represented by A/FB. Further, A/Fr shown in FIG. 6 represents a reference value for the air-fuel ratio on the basis of which the time point t2 is determined. Furthermore, reference symbol QgA represents the EGR quantity in the compression-stroke injection mode MA, QgB represents the EGR quantity in the suction-stroke injection mode MB, QaA represents the intake air flow or quantity in the compression-stroke injection mode MA, and QaB represents the intake air quantity in the suction-stroke injection mode MB.

As can be seen from FIG. 6, the fuel control system for the cylinder injection type internal combustion engine has two fuel injection modes, i.e., the compression-stroke injection mode MA and the suction-stroke injection mode MB.

In the compression-stroke injection mode MA, the fuel is supplied to the engine 1 during the compression stroke to effectuate the stratified combustion in the over-lean state (i.e., the state in which the air-fuel mixture is excessively lean) in order to enhance emission and fuel consumption features of the engine. On the other hand, in the suction-stroke injection mode MB, the fuel is injected during the suction stroke. In that case, the ordinary combustion of uniform mixture is realized, whereby the engine output power can be increased.

FIG. 7 is a flow chart for illustrating operation sequence or control program stored in a microcomputer or microprocessor incorporated in the ECU unit 8 shown in FIG. 5. Further, FIG. 8 shows desired values of various control quantities in the form of two-dimensional map as a function of the engine rotation number Ne (rpm) and the engine load Le. For instance, there are shown map data values of the desired air-fuel ratio A/Fo, desired fuel injection timing Tjo, desired ignition timing Tpo, desired EGR quantity Qgo and the desired intake air quantity Qao, respectively.

Referring to FIG. 7, the ECU unit 8 makes decision concerning the fuel injection mode M of the engine 1 on the basis of the information of the intake air quantity Qa, the throttle opening degree α, the crank angle signal SGT, the cooling water temperature Tw, the oxygen concentration Do of the exhaust gas and the cylinder identifying signal SGC outputted, respectively, from the relevant sensors installed on the engine 1 (step S1), to thereby determine whether or not the current fuel injection mode M is the suction-stroke injection mode MB (step S2).

When it is decided in the step S2 that the engine 1 is in the suction-stroke injection mode MB (i.e., when the decision step S2 results in affirmation "YES"), the ECU 8 arithmetically determines or calculates the control quantities, i.e., the desired air-fuel ratio A/Fo, the desired fuel injection timing Tjo, the desired ignition timing Tpo, the desired EGR quantity Qgo and the desired intake air quantity Qao for the suction-stroke fuel injection (refer to FIG. 8) in a step S3.

At this juncture, it should be mentioned that the desired values mentioned above are previously calculated as the values set separately for the suction-stroke fuel injection and the compression-stroke fuel injection, respectively, in dependence on the engine rotation number Ne (rotation speed in rpm) and the engine load Le (represented ordinarily by the intake air quantity Qa in each combustion cycle).

Subsequently, tailing processing for decreasing gradually the desired air-fuel ratio A/Fo is executed to enrich the air-fuel mixture (step S4), which is then followed by a step S5 where it is decided in the step S5 whether or not the desired air-fuel ratio A/Fo is greater than a reference value A/Fr (i.e., whether or not the air-fuel mixture is lean, to say in another way).

When it is decided that the desired air-fuel ratio A/Fo is greater than the reference value A/Fr (i.e., in case the decision step S5 results in "YES"), the calculated values of the desired fuel injection timing Tjo and the desired ignition timing Tpo for the compression-stroke fuel injection are adopted (step S6), whereon the procedure exits from the processing routine shown in FIG. 7 and proceeds to a succeeding processing.

On the other hand, when it is decided in the step S5 that the desired air-fuel ratio A/Fo is equal to or smaller than the reference value A/Fr (i.e., in case the decision step S5 results in negation "NO"), the step S6 is skipped, and the values of the desired fuel injection timing Tjo and the desired ignition timing Tpo calculated for the suction-stroke fuel injection in the step S3 are adopted, whereon the procedure leaves the processing routine illustrated in FIG. 7 to proceed to the succeeding processing.

By contrast, when it is decided in the aforementioned step S2 that the engine 1 is not in the suction-stroke injection mode MB but in the compression-stroke injection mode MA (i.e., when the decision step S2 results in negation "NO"), the desired air-fuel ratio A/Fo, the desired fuel injection timing Tjo, the desired ignition timing Tpo, the desired EGR quantity Qgo and the desired intake air quantity Qao for the compression-stroke fuel injection are affirmatively determined as the control quantities on the basis of the engine rotation number (engine speed) Ne and the engine load Le, as mentioned previously in conjunction with the step S3, whereon the control procedure leaves the processing routine shown in FIG. 7 and proceeds to a succeeding processing.

Through the procedure comprised of the processing steps S1 to S7 described above, the tailing processing (i.e., gradually decreasing processing) of the air-fuel ratio A/F is started at the time point t1 at which the fuel injection mode M is changed over to the suction-stroke injection mode MB from the compression-stroke injection mode MA, as shown in FIG. 6.

Further, at the time point t2 at which the air-fuel ratio A/F becomes equal to or smaller than the reference value A/Fr, the fuel injection timing Tj and the ignition timing Tp are changed over from the timings for the compression-stroke combustion to the timings for the suction-stroke combustion.

In conjunction with the changeover of the fuel injection mode M from the compression-stroke injection mode MA to the suction-stroke injection mode MB, it is however noted that the combustion is likely to be unstable because not only the air-fuel ratio A/F and the fuel injection timing Tj but also the control quantities such as the ignition timing Tp, the EGR quantity Qg and the intake air quantity Qa are varied.

By way of example, when the fuel injection mode M is changed over from the compression-stroke injection mode MA to the suction-stroke injection mode MB, as shown in FIG. 6, then, the air-fuel ratio A/F, the EGR quantity Qg and the intake air quantity Qa are varied from the control quantities A/FA, QgA and QaA for the compression-stroke fuel injection to the control quantities A/FB, QgB and QaB for the suction-stroke fuel injection, whereon the succeeding control is started.

In that case, in connection with the control of the air-fuel ratio A/F, the tailing operation from the air-fuel ratio A/FA to the air-fuel ratio A/FB is started in order to suppress abrupt or shock-like variation of the engine torque.

On the other hand, the fuel injection timing Tj and the ignition timing Tp can instantaneously be changed over to the fuel injection timing Tj and the ignition timing Tp for the suction stroke combustion from to those for the compression stroke combustion at the time point t2 at which the air-fuel ratio A/F becomes equal to or smaller than the predetermined reference value A/Fr (i.e., at the timing point when the air-fuel mixture becomes lean) because there are two stable time points in respect to the combustion in the compression stroke and the suction stroke.

Furthermore, in conjunction with the control of the EGR quantity Qg and the intake air quantity Qa, it is noted that upon changing-over of the fuel injection mode M from the compression-stroke fuel injection mode to the suction-stroke fuel injection mode, some time lag is involved for the EGR quantity QgA and the intake air quantity QaA to reach the desired EGR quantity QgB and the desired intake air quantity QaB (desired control quantities) after the changeover of the fuel injection mode M, respectively.

However, since the intake air quantity Qa supplied to the engine 1 is measured by means of the intake air flow sensor 2 (see FIG. 5), the lag involved in feeding the intake air to the engine upon the mode changeover mentioned above can be measured. Accordingly, the lag in feeding the intake air does not exert any appreciable influence to the control of the air-fuel ratio A/F because the latter is controlled on the basis of the measured value derived from the output of the intake air flow sensor 2.

By contrast, the EGR quantity Qg which is so set that the combustion can take place without fail can vary as the intake air quantity Qa and the air-fuel ratio A/F change upon changeover of the fuel injection mode M. In other words, the EGR quantity Qg changes in dependence on both the air-fuel ratio A/F and the intake air quantity Qa which vary upon every changeover of the fuel injection mode M.

Consequently, there may arise such situation in which the combustion becomes unstable although it depends on the combination of the variable parameters such as the air-fuel ratio A/F, the intake air quantity Qa and others.

Additionally, it is noted that in the fuel control system for the cylinder injection type internal combustion engine, the fuel is supplied to the engine cylinder immediately before the ignition timing so that the stratified combustion can occur in the compression-stroke injection mode MA as described hereinbefore. Accordingly, the air-fuel ratio of the air-fuel mixture around the spark plug 9 in the actual combustion is close to the stoichiometric ratio of 14.7, even though the air-fuel ratio of the mixture as supplied is thirty or more.

Certainly in the indirect injection type fuel control system in which the fuel is injected into the intake passageway (see FIG. 4), combustion takes place with the air-fuel ratio of ca. 20 (lean burn) after the intake air and the fuel have been mixed uniformly. By contrast, in the fuel control system for the cylinder injection type internal combustion engine, combustion in the compression-stroke injection mode is performed by firing the air-fuel mixture existing around the spark plug 9 and having the air-fuel ratio of ca. 16. Consequently, in the fuel control system for the cylinder injection type internal combustion engine, greater amount of nitrogen oxides (NOx) is discharged when compared with the indirect injection type engine. Such being the circumstances, in the cylinder injection type internal combustion engine, a large amount or quantity of exhaust gas is recirculated to the engine with a view to realizing reduction of nitrogen oxides (NOx).

As will now be apparent from the foregoing description, in the fuel control system for the cylinder injection type internal combustion engine known heretofore such as disclosed in Japanese Unexamined Patent Application Publication No. 187819/1992 (JP-A-4-187819), combustion in the compression-stroke injection mode MA is carried out through combination of the stratified combustion which can be realized by subtle control of the fuel injection timing Tj and the ignition timing Tp and recirculation of a large amount or quantity of exhaust gas which may lead to degradation of the combustion in the ordinary indirect injection type engine 1 (see FIG. 4).

On the other hand, in the suction-stroke injection mode MB which can ensure high output torque of the engine, the fuel injection is performed similarly to that of the indirect injection type engine for thereby effectuating uniform mixture combustion.

When the fuel injection mode M is changed over to the rich combustion state in the suction-stroke injection mode MB from the over-lean combustion state in the compression-stroke injection mode MA, the air-fuel ratio A/F, the EGR quantity Qg, the fuel injection timing Tj and the ignition timing Tp are correspondingly changed under the control of the ECU and at the same time the quantity of intake air fed to the engine 1 is decreased by controlling correspondingly the air bypass valve 10 (see FIG. 5) in order to prevent the output torque of the engine from fluctuation which may otherwise be brought about by the changeover from the compression-stroke injection mode MA to the suction-stroke injection mode MB.

In this manner, for changing over the fuel injection mode M to the suction-stroke injection mode MB from the compression-stroke injection mode MA, a large number of control parameters have to be changed simultaneously in order to afford the change or variation of the combustion state.

In conjunction with the simultaneous changeover of many control parameters, it is however noted that because of nonuniformity in the performance among the components subjected to the control with the respective parameters, age changing thereof, variation in the environmental conditions during the running of the motor vehicle and/or difference of the combustion states, there may arise such situation in which the combustion state can not make transition smoothly to the combustion of uniform mixture from the stratified combustion, incurring possibly unstable combustion and hence fluctuation of the rotation speed of the engine 1 upon changeover of the fuel injection mode M.

Under the circumstances, such changeover control is performed for the control parameters that upon changeover of the fuel injection mode M of the engine 1, parameters such as the EGR quantity Qg and the intake air quantity Qa the control of which is usually accompanied with lag are controlled in precedence to the change-over control of the fuel injection timing Tj and the ignition timing Tp so that the changeover controls of the individual components as involved can be performed effectively at a same time.

In the fuel control system for the cylinder injection type internal combustion engine among others, recirculation of a large quantity of exhaust gas is carried out in many operation ranges of the engine. Accordingly, even when the EGR control is performed effectively simultaneously with the control of the other relevant components upon changeover of the fuel injection mode M, there may actually occur such situation that the air-fuel mixture undergoes combustion in the course of change of the EGR quantity Qg (and hence with various EGR quantities), presenting a problem that unstable state of combustion may be brought about.

As will now be understood from the above, in the fuel control system for the cylinder injection type internal combustion engine, the changeover control of the fuel injection mode is performed such that the fuel injection timing Tj, the ignition timing Tp and other parameters are changed under control after the EGR quantity Qg and the intake air quantity Qa have been controlled in precedence.

However, the EGR quantity Qg introduced into the engine may vary continuously even after the changeover control of the fuel injection timing Tj and the ignition timing Tp, giving rise to a problem that the unstable combustion state may thereby be incurred.

SUMMARY OF THE INVENTION

In the light of the state of the art described above, it is contemplated with the present invention to solve the problems mentioned above by providing improved control technique.

Accordingly, it is an object of the present invention to provide fuel control method and system for a cylinder injection type internal combustion engine, which method and system are capable of changing over the fuel injection mode such that the compression-stroke injection mode can make transition smoothly to the suction-stroke injection mode while ensuring stable combustion state without need for additional provision of any especial hardware devices.

In view of the above and other objects which will become apparent as the description proceeds, there is provided according to a general aspect of the present invention a fuel control system for a cylinder injection type internal combustion engine, which system includes an intake air flow sensing means for detecting an intake air flow fed to the internal combustion engine, a crank angle sensing means for detecting rotation speed (rpm) of the internal combustion engine and a crank angle thereof, a fuel injection means installed in each of cylinders of the internal combustion engine for injecting fuel directly into each of the cylinders, an exhaust gas recirculation means for regulating quantity of exhaust gas recirculated from an exhaust passageway of the internal combustion engine to an intake passageway thereof, and an electronic control unit for arithmetically determining control quantities for the fuel injection means and the exhaust gas recirculation means, respectively, on the basis of detection information derived from outputs of the intake air flow sensing means and the crank angle sensing means, respectively, wherein when fuel injection mode of the internal combustion engine is changed over from a compression-stroke fuel injection mode for realizing a high air-fuel ratio to a suction-stroke fuel injection mode for realizing a low air-fuel ratio, the electronic control unit changes control quantity for the exhaust gas recirculation means in precedence to other control quantities for the suction-stroke fuel injection mode.

In a preferred mode for carrying out the invention, the electronic control unit may be so designed that when the fuel injection mode is to be changed over from the compression-stroke fuel injection mode to the suction-stroke fuel injection mode, the control quantity for the exhaust gas recirculation means is changed in precedence to the other control quantities for the suction-stroke fuel injection mode by a preceding time period sufficiently longer than a time lag involved in changing the control of the exhaust gas recirculation effectuated through the exhaust gas recirculation means for the suction-stroke fuel injection mode.

By virtue of the arrangements described above, the fuel injection mode M can be changed over smoothly to the suction-stroke fuel injection mode from the compression-stroke fuel injection mode by controlling the air-fuel ratio, the fuel injection timing and the ignition timing while ensuring stable combustion state after the exhaust gas recirculation state as changed has been stabilized.

In another preferred mode for carrying out the invention, the electronic control unit may be so designed that when the internal combustion engine is operating in an idle operation range at a time point the fuel injection mode of the internal combustion engine is changed over from the compression-stroke fuel injection mode to the suction-stroke fuel injection mode, the control for the exhaust gas recirculation means is performed continuously in precedence to changing other control quantities for the suction-stroke fuel injection mode over a longer preceding time period than in any other operation range.

Owing to the above-mentioned arrangement, the changeover of the fuel injection mode can be effectuated smoothly particularly in the idle operation range (i.e., the operation range in which the intake air quantity is small) in which combustion has to be stable with the intake air flow rate changing scarcely and in which the combustion state can be easily perceived by the driver.

In yet another preferred mode for carrying out the invention, the electronic control unit may be so designed that when the internal combustion engine is operating in an accelerating operation range at a time point the fuel injection mode of the internal combustion engine is changed over from the compression-stroke fuel injection mode to the suction-stroke fuel injection mode, a preceding time period for changing the control quantity for the exhaust gas recirculation means in precedence to the other control quantities for the suction-stroke fuel injection mode is set shorter than in any other operation range.

In a further preferred mode for carrying out the invention, the electronic control unit may be so designed that upon changeover of the fuel injection mode of the internal combustion engine from the compression-stroke fuel injection mode to the suction-stroke fuel injection mode, a preceding time period for changing the control quantity for the exhaust gas recirculation means is set variable as a function of the rotation speed (rpm) of the internal combustion engine.

Owing to the arrangement mentioned above, changeover of the fuel injection mode can be realized smoothly independent of the engine speed (rpm).

In a yet further preferred mode for carrying out the invention, the electronic control unit may be so designed that upon changeover of the fuel injection mode of the internal combustion engine from the compression-stroke fuel injection mode to the suction-stroke fuel injection mode, a preceding time period for changing the control quantity for the exhaust gas recirculation means is set to be variable in dependence on rate of change in the rotation speed (rpm) of the internal combustion engine.

With the arrangement described above, drivability of the engine and hence that of the motor vehicle can be enhanced even when the rate of change of the engine rotation speed varies.

In a still further preferred mode for carrying out the invention, the electronic control unit may be so designed that upon changeover of the fuel injection mode of the internal combustion engine from the compression-stroke fuel injection mode to the suction-stroke fuel injection mode, a preceding time period for changing the control quantity for the exhaust gas recirculation means is set to be zero unless the rate of change in the rotation speed (rpm) of the internal combustion engine is lower than a predetermined value.

By virtue of the above-mentioned arrangement, the changeover of the fuel injection mode can be realized substantially instantaneously without nay appreciable time lag even when the rate of change of the engine rotation speed is high, whereby the drivability of the engine as well as that of the motor vehicle can be enhanced.

Furthermore, according to another aspect of the present invention, there is provided a method of controlling fuel injection in a cylinder injection type internal combustion engine, which method includes the steps of detecting an intake air flow fed to the internal combustion engine, detecting rotation speed (rpm) of the internal combustion engine and a crank angle thereof, injecting fuel directly into each of the cylinders, regulating a quantity of exhaust gas recirculated from an exhaust passageway of the internal combustion engine to an intake passageway thereof, and determining arithmetically control quantities for the fuel injection and the exhaust gas recirculation on the basis of detected intake air flow and crank angle, respectively, wherein when fuel injection mode of the internal combustion engine is changed over from a compression-stroke fuel injection mode for realizing a high air-fuel ratio to a suction-stroke fuel injection mode for realizing a low air-fuel ratio, the exhaust gas recirculation is controlled in precedence to any other control for the suction-stroke fuel injection mode.

In carrying out the control method described above, the exhaust gas recirculation should preferably be controlled in precedence to any other control for the suction-stroke fuel injection mode over a preceding time period sufficiently longer than a time lag involved in the change over of the control of the exhaust gas recirculation.

Further, when the internal combustion engine is operating in an idle operation range at the time point the fuel injection mode of the internal combustion engine is changed over from the compression-stroke fuel injection mode (MA) to the suction-stroke fuel injection mode, the control of the exhaust gas recirculation should preferably be changed over in precedence to any other control for the suction-stroke fuel injection mode over a longer preceding time period than in any other operation range.

Furthermore, when the internal combustion engine is operating in an accelerating operation range at the time point the fuel injection mode of the internal combustion engine is to be changed over from the compression-stroke fuel injection mode to the suction-stroke fuel injection mode, a preceding time period for changing over the control of the exhaust gas recirculation in precedence to the other control for the suction-stroke fuel injection mode should preferably be set shorter than that in any other operation range.

Alternatively, the time period for changing over the control of the exhaust gas recirculation may be set to be variable as a function of the rotation speed (rpm) of the internal combustion engine.

Besides, the time period for changing over the control of the exhaust gas recirculation for the suction-stroke fuel injection mode may be set to be variable in dependence on a rate of change in the rotation speed (rpm) of the internal combustion engine.

Furthermore, the time period for changing over the control of the exhaust gas recirculation may be set to be zero when the rate of change in the rotation speed (rpm) of the internal combustion engine is higher than a predetermined value.

According to the teachings of the present invention described above, there can be realized the fuel control method and system for the cylinder injection type internal combustion engine which allows the fuel injection mode to be changed over to the suction-stroke fuel injection mode from the compression-stroke fuel injection mode smoothly while maintaining the stability of combustion, whereby drivability as well as fuel-cost performance of the engine and hence the motor vehicle can be enhanced significantly. Moreover, the teachings of the present invention can be realized softwarewise by correspondingly modifying a fuel injection control program executed by a microcomputer incorporated in the electric control unit without need for additional provision of any especial devices. Thus, the present invention can be applied to the existing fuel control system for the cylinder injection type internal combustion engine without need for changing or modifying the hardware configuration of the fuel control system and the engine system. In other wards, the present invention can be carried out very inexpensively while ensuring very advantageous effects.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
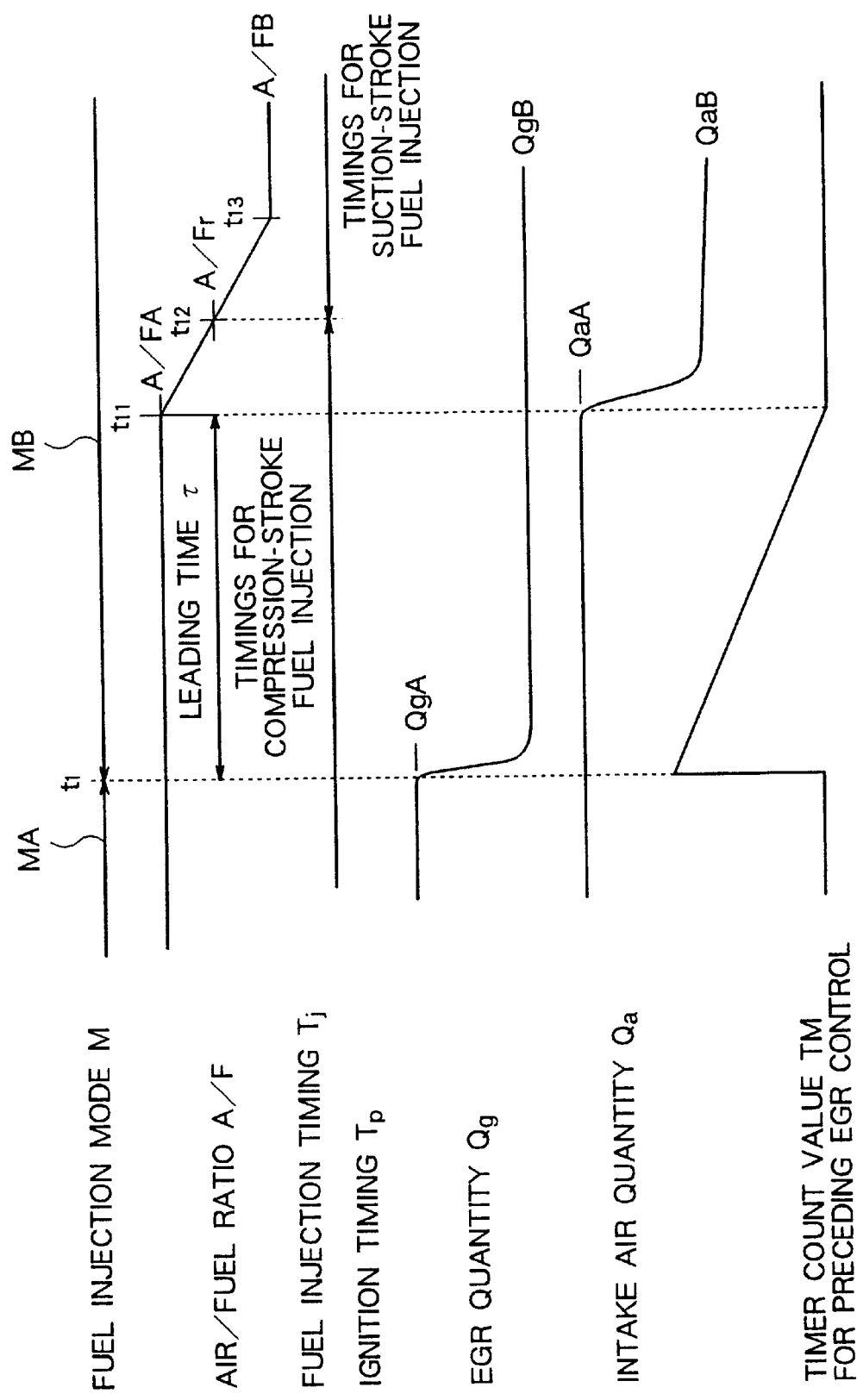
FIG. 1 is a timing/waveform diagram for illustrating changes of various quantities and parameters upon changeover from a compression-stroke fuel injection mode to a suction-stroke fuel injection mode in a fuel control system for a cylinder injection type internal combustion engine according to a first embodiment of the present invention.

Now, the present invention will be described in detail in conjunction with what is presently considered as preferred or typical embodiments thereof by reference to the drawings. In the following description, like reference characters designate like or corresponding parts throughout the several views.

Embodiment 1

Figure 6:
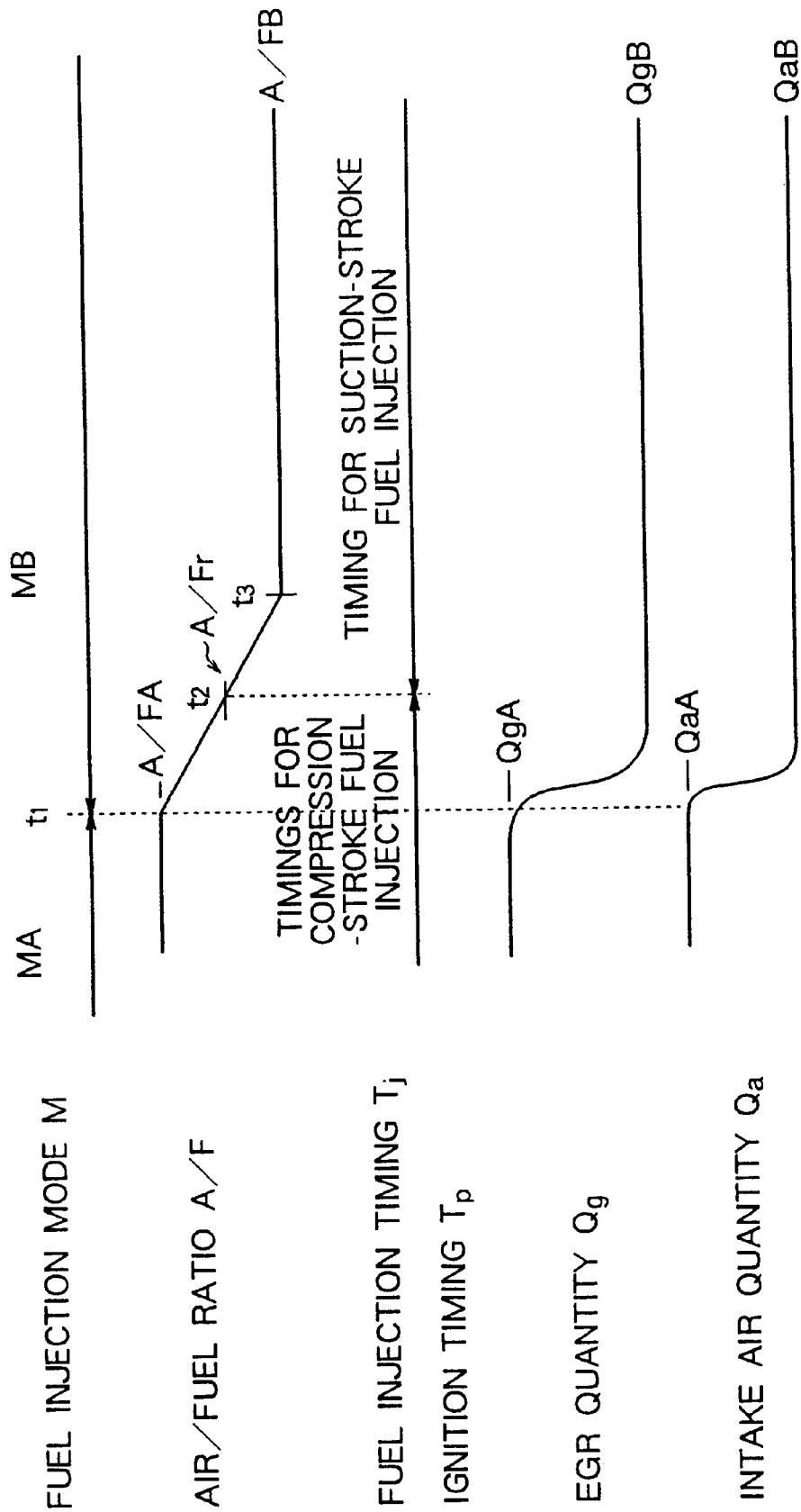
FIG. 6 is a timing/waveform diagram for illustrating a fuel injection mode changeover control operation performed by the conventional fuel control system shown in FIG. 5.

Now, description will be made of the fuel control system for the cylinder injection type (or direct injection type) internal combustion engine according to a first embodiment of the invention. FIG. 1 is a timing/waveform diagram for illustrating the fuel injection changeover control procedure in the fuel control system according to the instant embodiment, wherein symbols "M", "MA", "MB", "A/F", "A/FA", A/Fr", "A/FB", "Qg", "QgA", "QgB", "Qa" "QaA"

and "QaB" represent same meanings as those described hereinbefore by reference to FIG. 6. Accordingly, repeated description thereof is omitted.

As in the case of to FIG. 6, there is illustrated in FIG. 1 transition of the fuel injection mode M from the compression-stroke injection (over lean) mode MA to the suction-stroke injection mode MB.

Figure 5:
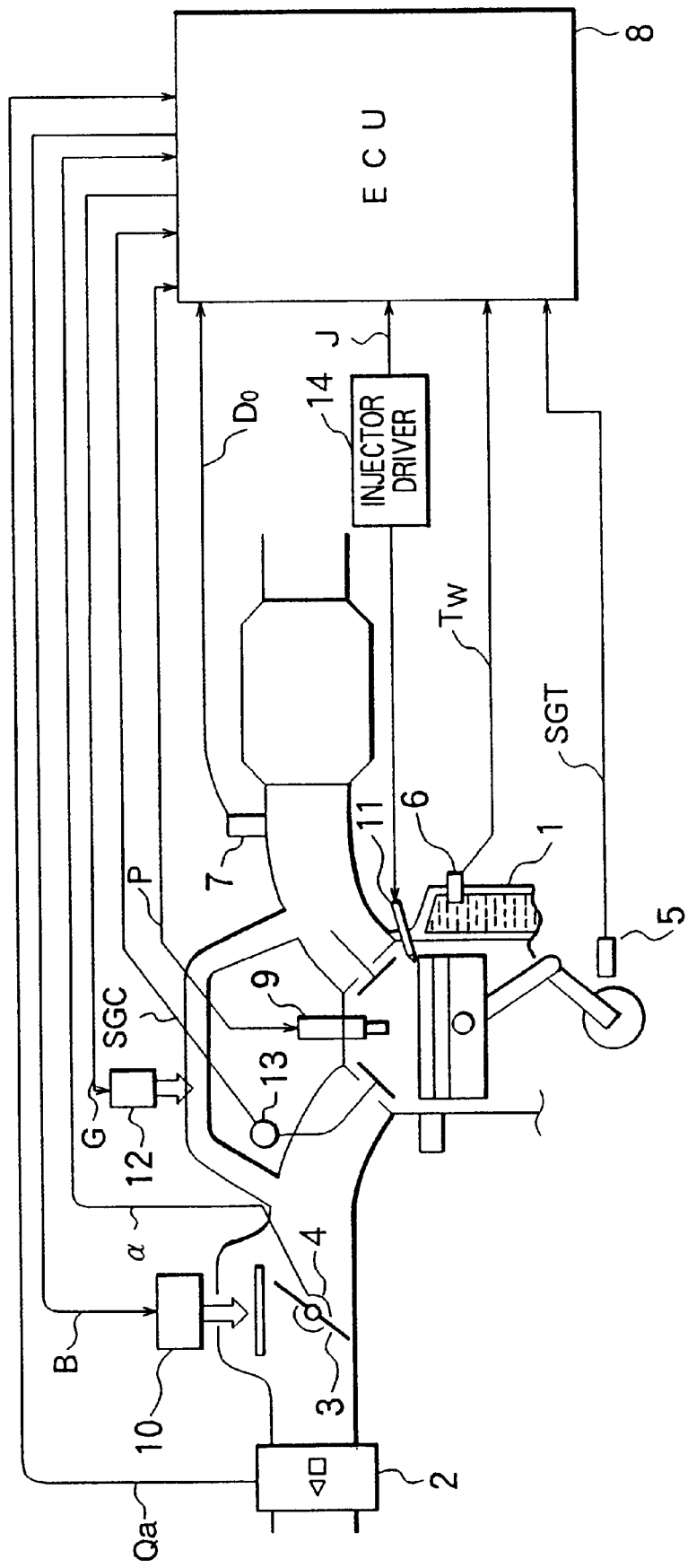
FIG. 5 is a schematic diagram showing a structure of a conventional cylinder injection type internal combustion engine equipped with a fuel control system to which the present invention can also be applied.

Further, the system configuration of the fuel control system according to the instant embodiment of the invention is essentially same as that shown in FIG. 5. Furthermore, desired value map data employed in the instant embodiment is essentially same as those shown in FIG. 8.

Referring to FIG. 1, reference character TM designates a counter value of a timer for causing the EGR changeover control to be validated in precedence to the changeover of the other control quantities for the suction-stroke fuel injection mode MB, and τ represents the preceding or leading time by which the EGR changeover control proceeds to the latter. At this juncture, it should be noted that according to the present invention, the preceding or leading time τ is set to be sufficiently longer than a time which corresponds to a time lag involved in the changeover control of the EGR quantity Qg (i.e., lag equivalent to the time taken for the EGR quantity Qg to change from one stable state for the compression-stroke fuel injection mode to another for the suction-stroke fuel injection mode in response to a relevant control command).

Parenthetically, the timer for setting the leading time τ may be incorporated in the ECU unit 8 as a counter in which the timer count value TM is placed.

Figure 8:
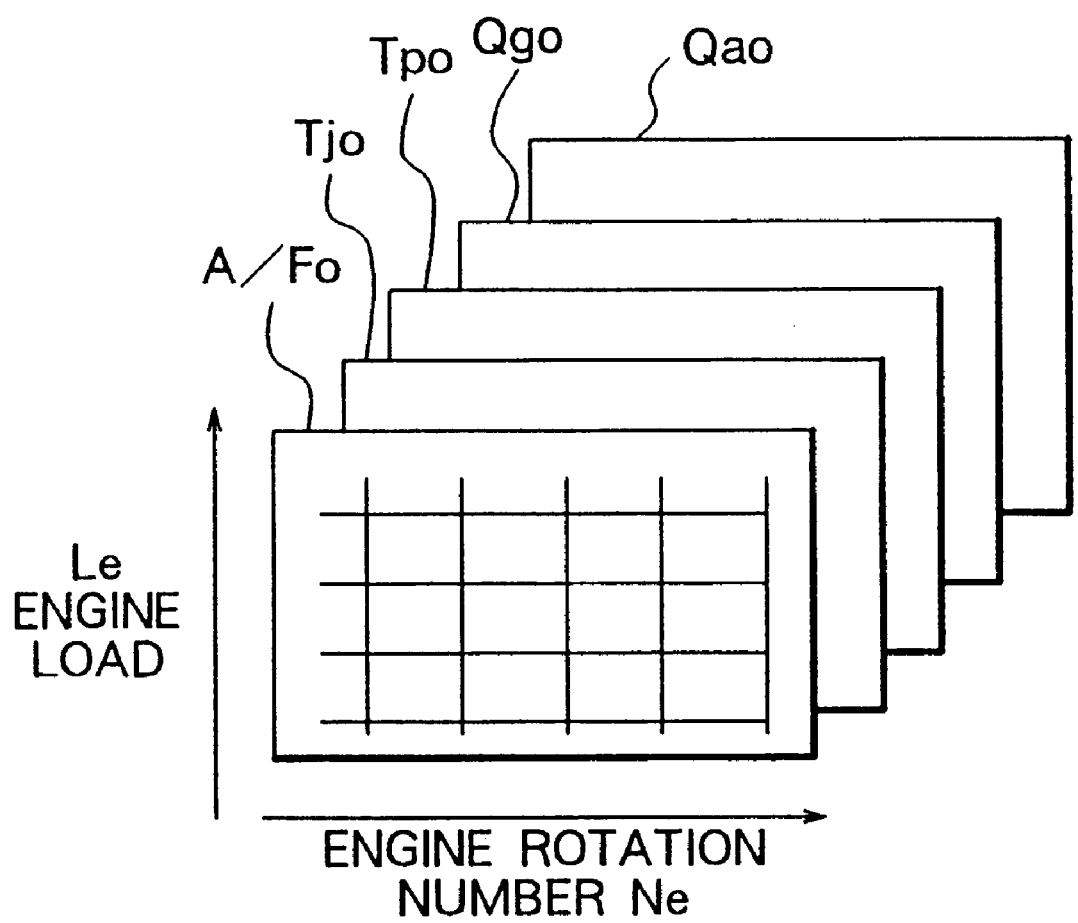
FIG. 8 is a view for illustrating a structure of map data representing desired values of control quantities set and stored previously to be referenced in executing the fuel injection mode changeover control procedure.

Next, referring to FIGS. 1 and 2 in combination with FIGS. 5 and 8, description will be made of operation of the fuel control system for the cylinder injection type internal combustion engine according to the first embodiment of the present invention.

Figure 2:
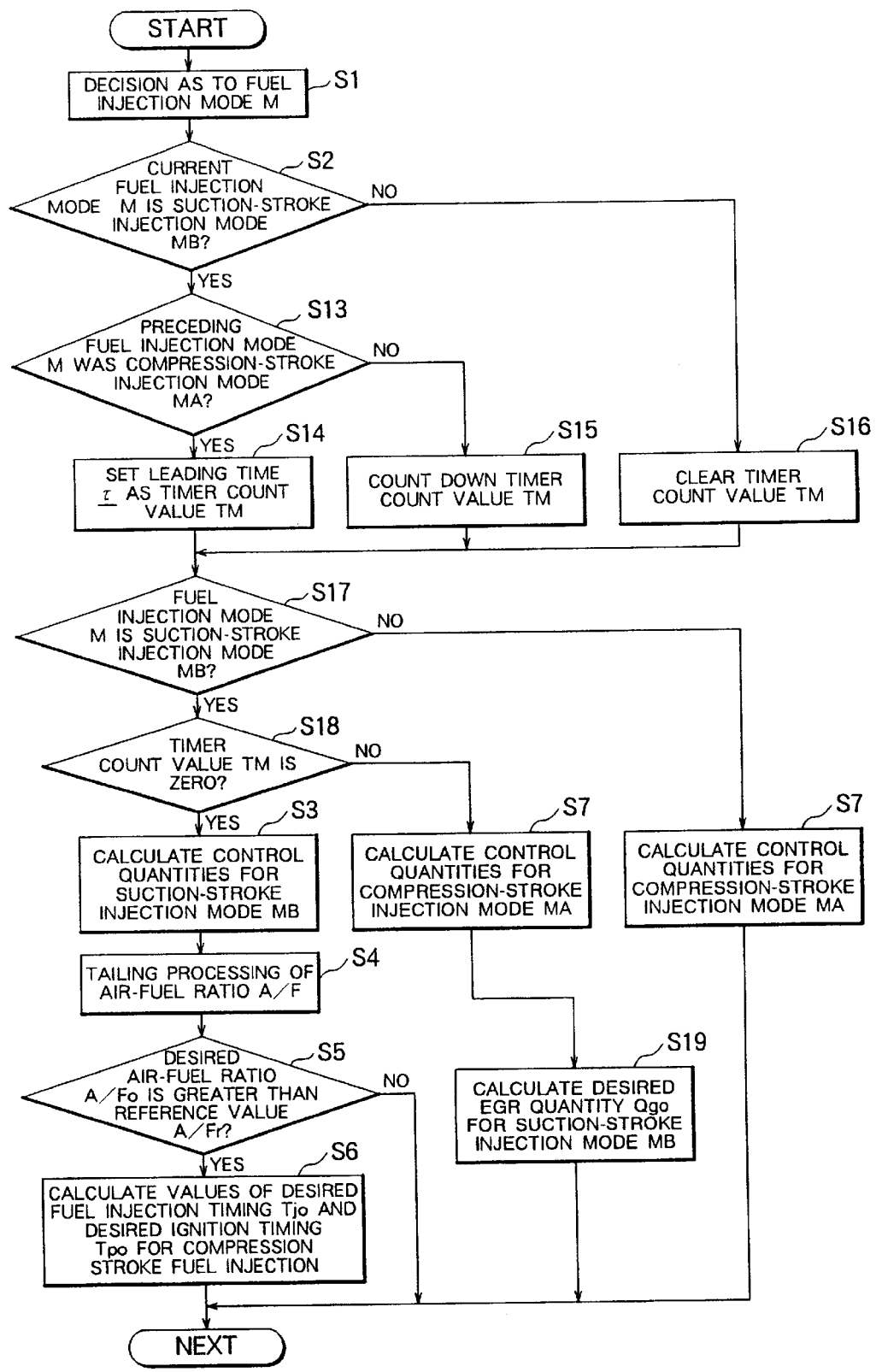
FIG. 2 is a flow chart for illustrating control procedure for changing over a fuel injection mode from the compression-stroke fuel injection mode to the suction-stroke fuel injection mode as executed by an electronic control unit incorporated in the fuel control system according to the first embodiment of the invention.
Figure 7:
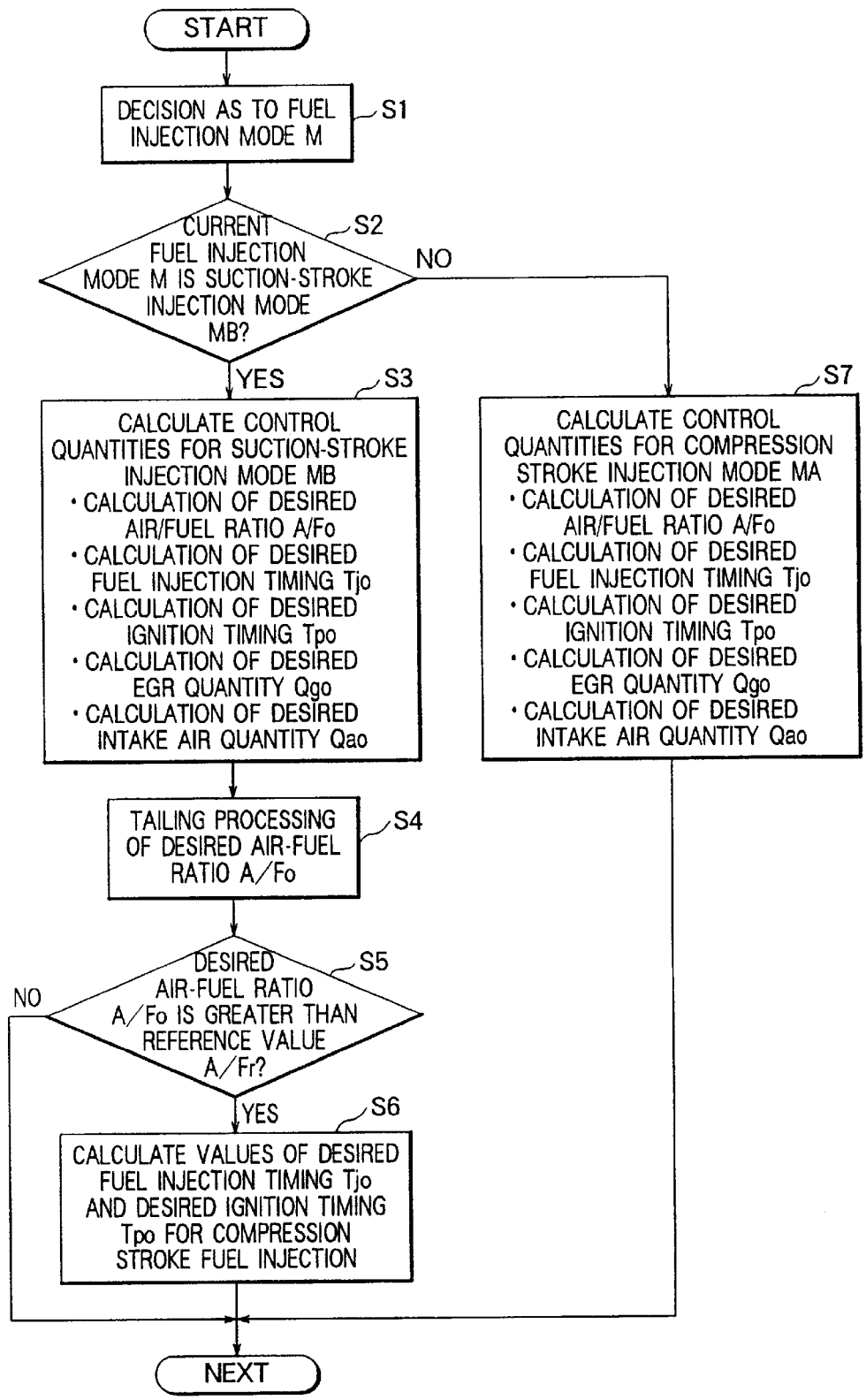
FIG. 7 is a flow chart for illustrating a fuel injection mode changeover procedure executed by an electronic control unit incorporated in the conventional fuel control system shown in FIG. 5.

FIG. 2 is a flow chart for illustrating control operation sequence or control procedure executed for changing over the fuel injection mode M by the ECU incorporated in the fuel control system according to the instant embodiment of the invention. In this flow chart, the step S1 to the step S7 are essentially same as those described hereinbefore by reference to FIG. 7. Accordingly, repetitive description of these processing steps will be unnecessary.

As mentioned previously, upon changeover of the fuel injection mode M to the suction-stroke injection mode MB (i.e., mode in which the fuel is injected directly into the cylinder during the suction stroke of the engine) from the compression-stroke injection mode MA (i.e., mode in which the fuel is directly injected into the cylinder during the compression stroke of the engine) at a time point t1 (refer to FIG. 1), it is decided in the step S2 that the current fuel injection mode M is the suction-stroke injection mode MB (i.e., the decision step S2 results in "YES"), whereupon execution of the procedure or processing, to say in another way, proceeds to a next step S13.

In the step S13, the ECU unit 8 makes decision as to whether or not the preceding fuel injection mode M was the compression-stroke injection mode MA. When it is decided that the preceding fuel injection mode M was the compression-stroke injection mode MA (i.e., when the decision step S13 results in affirmation "YES"), then it is regarded that the fuel injection mode M has been changed over just before.

Accordingly, as the counter value TM of the timer for the preceding changeover control for the exhaust gas recirculation, the leading time τ (e.g. 0.2 second) is set in a step S14, whereon the processing proceeds to a fuel injection mode decision step S17.

Thereafter, when it is decided in the step S13 in the succeeding processing cycle that the preceding fuel injection mode M was the suction-stroke injection mode MB (i.e., when the decision step S13 results in negation "NO", the timer count value TM is counted down or decremented in a step S15, and then the processing proceeds to the succeeding step S17.

Further, when it is decided in the decision step S2 that the current fuel injection mode M is not the suction-stroke injection mode MB but the compression-stroke injection mode MA (i.e., when the decision step S2 results in "NO"), the timer count value TM is cleared to zero (step S16), and the processing proceeds to the next step S17.

Through the procedure described above, the EGR quantity Qg is changed, starting from the time point t1 at which the compression-stroke injection mode MA is changed over to the suction-stroke injection mode MB, as illustrated in FIG. 1, while the EGR quantity QgA in the compression stroke (for lean-mixture combustion) is changed over to the EGR quantity QgB in the suction stroke (for ordinary combustion).

During the period corresponding to the leading time τ (i.e., from the time point t1 to the time point t11), such control state continues in which only the EGR quantity Qg is controlled in dependence on the EGR quantity QgB in the suction stroke. Ordinarily, in this state (or in the suction stroke), the exhaust gas is scarcely recirculated.

Subsequently, in the step S17, decision is made whether or not the fuel injection mode M is the suction-stroke injection mode MB. When it is decided that the fuel injection mode M is the compression-stroke injection mode MA (i.e., when the decision step S17 results in "NO"), then the control quantity calculating step S7 for the compression-stroke injection mode MA as described hereinbefore is executed. Thereafter, the processing leaves the processing routine illustrated in FIG. 2, and a succeeding procedure is executed.

On the other hand, when it is decided in the step S17 that the fuel injection mode M is the suction-stroke injection mode MB (i.e., when the decision step S17 results in "YES"), then it is decided in a step S18 whether or not the timer count value TM has been decremented to zero (i.e., whether or not the leading time τ has lapsed).

When the decision step S18 results in "YES", indicating that the timer count value TM is zero, this means that the leading time τ (second) has lapsed since the changeover of the fuel injection mode to the suction-stroke fuel injection mode MB from the compression-stroke fuel injection mode MA. Accordingly, the processing steps S3 to S6 for the suction-stroke injection mode MB described previously are executed, whereon the processing exits the routine illustrated in FIG. 2 and proceeds to the succeeding procure.

On the other hand, when the decision step S18 results in "NO", indicating that the timer count value TM is greater than zero, this means that the leading time τ has not lapsed yet. Accordingly, the control quantity calculating step S7 for the compression-stroke injection mode MA described previously is executed, whereon the desired EGR quantity Qgo (i.e., EGR quantity QgB) for the suction-stroke fuel injection mode MB is calculated in a step S19.

Thereafter, the processing exits from the processing routine illustrated in FIG. 2 and proceeds to the succeeding procure.

In this way, only the EGR quantity Qg is so controlled as to a assume the EGR quantity QgB for the suction-stroke injection mode MB until the leading time τ has lapsed.

In this way, by executing the processing steps S3 to S7 and steps S17 to S19 in dependence or the fuel injection mode M and the timer count value TM, each of the control quantities is changed over in such manner as illustrated in FIG. 1.

More specifically, at the time point t11 at which the timer count value TM becomes zero (i.e., when the leading time τ has lapsed since the changeover of the fuel injection mode M), the air-fuel ratio A/F and the intake air quantity Qa (referred also as the control quantity, respectively) begin to be changed over from the air-fuel ratio A/FA and the intake air quantity QaA (control quantities) for the compression stroke to the air-fuel ratio A/FB and the intake air quantity QaB (control quantities) for the suction stroke, respectively.

In that case, with regards to the air-fuel ratio A/F, the tailing processing (step S4) is executed to allow the air-fuel ratio A/F to make transition from the air-fuel ratio A/FA to the air-fuel ratio A/FB for suppressing shock due to the torque variation upon the changeover of the fuel injection mode, as described hereinbefore (refer to FIG. 6).

On the other hand, the fuel injection timing Tj and the ignition timing Tp are instantaneously changed over to the timings determined for the suction stroke fuel injection from those for the compression stroke fuel injection at the time point t12 when the air-fuel ratio A/F becomes smaller than the reference value A/Fr (i.e., when the air-fuel mixture becomes rich).

Embodiment 2

In the fuel control system for the cylinder injection type internal combustion engine according to the first embodiment of the invention, the leading time τ for controlling in precedence the exhaust gas recirculation EGR is set to be constant. However, the timer count value TM may be set variable in dependence on the engine rotation number Ne (rpm). A second embodiment of the present invention is directed to the fuel control system for the cylinder injection type internal combustion engine in which the timer count value TM is set variable in dependence on the engine speed (rpm).

Figure 3:
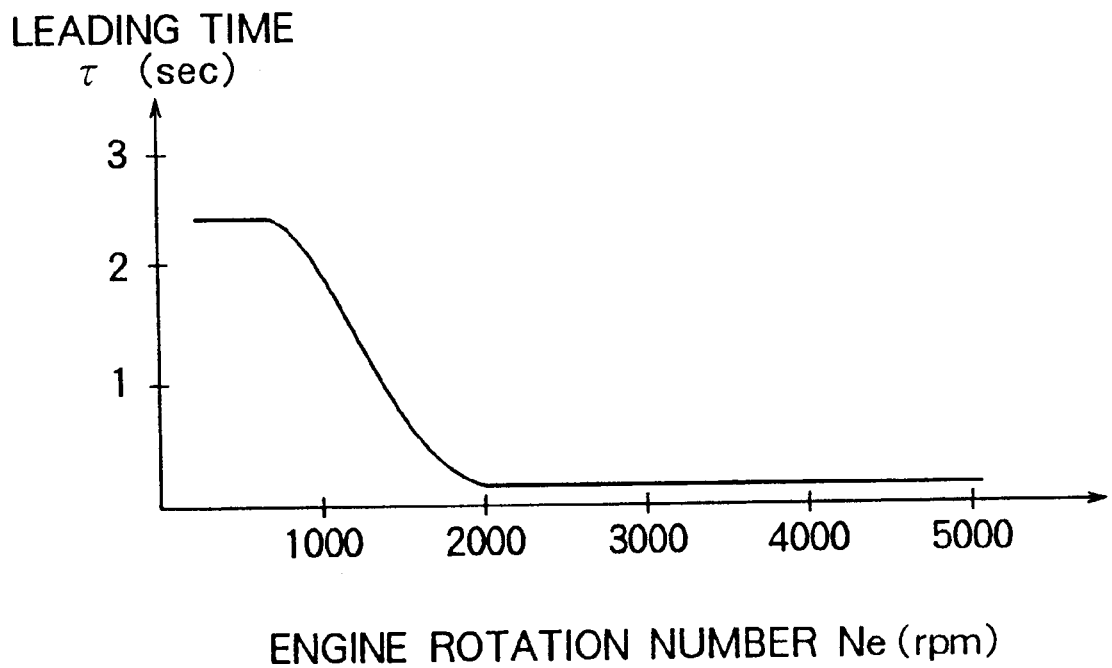
FIG. 3 is a view for illustrating graphically a characteristic change of a leading time for validating exhaust gas recirculation changeover control in precedence upon changeover of the fuel injection mode as a function of an engine rotation number in the fuel control system for a cylinder injection type internal combustion engine according to a second embodiment of the present invention.
Figure 4:
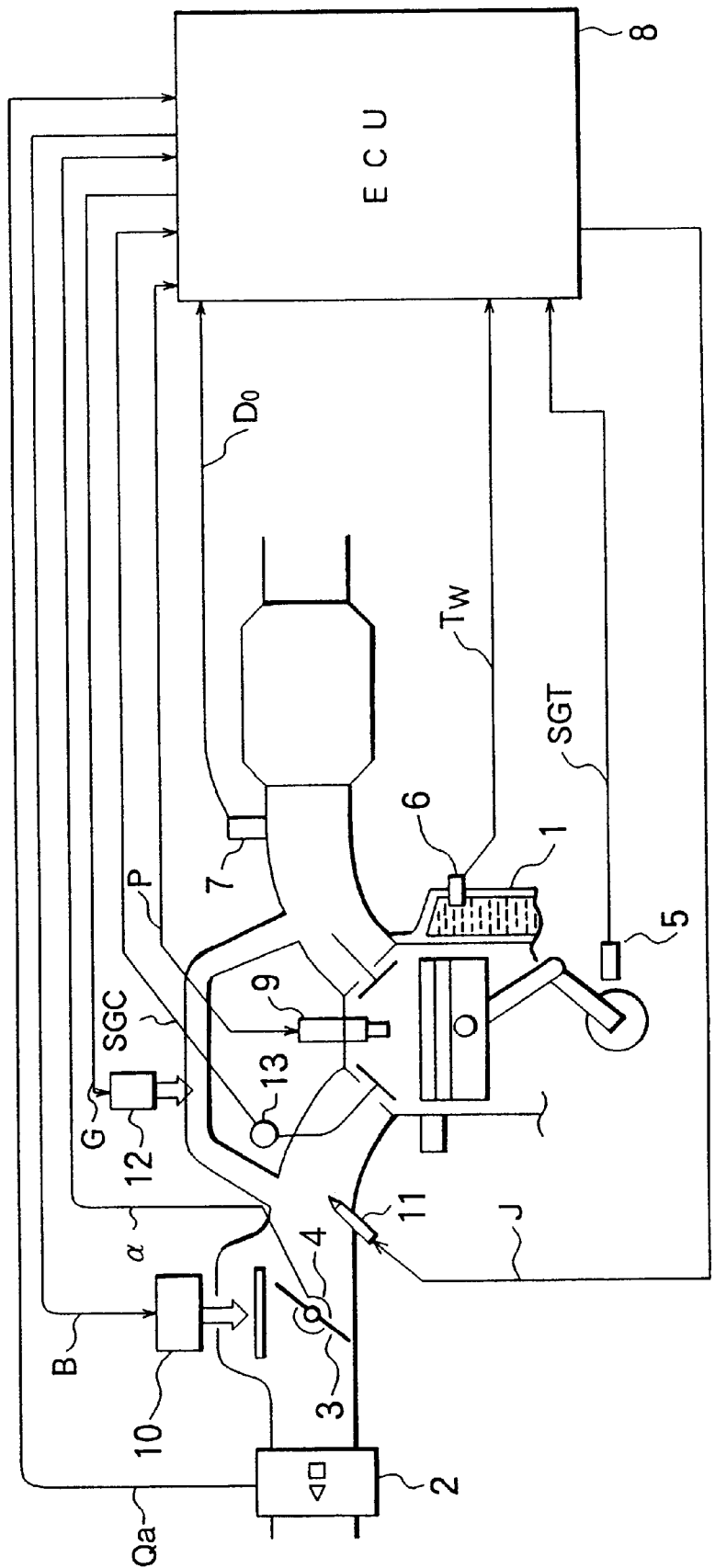
FIG. 4 is a schematic diagram showing a conventional fuel control system for an indirect fuel injection type internal combustion engine.

FIG. 3 is a view for illustrating graphically characteristic change of the leading time τ (second) as a function of the engine rotation number Ne (rpm) in the fuel control system for the cylinder injection type internal combustion engine according to the second embodiment of the invention.

According to the teaching of the present invention incarnated in the instant embodiment thereof, the ECU unit 8 (see FIG. 5) sets the leading time τ so that it varies in accordance with the characteristic curve illustrated in FIG. 3 in the step S14 for setting the timer count value TM (see FIG. 2).

More specifically, in the low-speed engine operation state in which the engine rotation number Ne (rpm) is lower than 1000 rpm inclusive thereof, the leading time τ is set to a value (e.g. about 2.3 second) greater than the value in the steady operation state of the engine (e.g. about 0.2 second).

In general, in the low speed operation range, the rate of the intake air fed to the engine 1 is low. In particular, in the idle operation of the engine, the intake air quantity Qa is small. Consequently, in the low speed operation range, such operation state is likely to occur in which the combustion itself becomes unstable.

In such operation state, the leading time τ for the preceding exhaust gas recirculation control is set longer with a view to realizing relatively stable combustion of the air-fuel mixture.

By elongating the leading time τ for the preceding exhaust gas recirculation changeover control, the fuel injection mode can make transition smoothly even when the engine operates in the idle operation range (i.e., the range in which the intake air quantity is small). In such operation range, the combustion is unstable with the intake air flow rate changing scarcely, and the combustion performance can be easily perceived by the driver.

On the other hand, in the high speed operation range (e.g. in an accelerating operation range), the operation state has to be changed speedily. Accordingly, in the high speed operation range os the engine, the leading time τ for the preceding exhaust gas recirculation changeover control is set shorter when compared with the leading time τ in the other operation ranges by referencing the characteristic data illustrated in FIG. 3. Parenthetically, the leading time τ may be set to zero.

Thus, in the accelerating state of the engine, the ECU 8 (see FIG. 5) sets variably the leading time τ in the step S14 by setting the timer count value TM in such manner as mentioned below.

Namely, some means for comparing the rate of change ΔNe of the engine rotation number Ne (rpm) with a predetermined reference value as the means for deciding whether or not the engine is in the accelerating state. When the rate of change ΔNe exceeds the predetermined value, the leading time τ is set to zero.

In general, in case the driver demands the accelerating operation, it is required to change speedily the operation state of the engine and hence that of the motor vehicle in order to protect the drivability of the motor vehicle against degradation. In that case, it is preferred to set the leading time τ to zero.

Thus, changeover of the fuel injection mode can be effected without any appreciable lag, whereby the drivability of the motor vehicle can be enhanced.

Many modifications and variations of the present invention are possible in the light of the above techniques. It is therefore to be understood that within the scope of the appended claims, the invention may be practiced otherwise than as specifically described.

What is claimed is:

1. A fuel control system for a cylinder injection type internal combustion engine, comprising:

intake air flow sensing means for detecting an intake air flow fed to said internal combustion engine;

crank angle sensing means for detecting rotation speed (rpm) of said internal combustion engine and a crank angle thereof;

fuel injection, means installed in each of cylinders of said internal combustion engine for injecting fuel directly into each of said cylinders;

exhaust gas recirculation means for regulating quantity of exhaust gas recirculated from an exhaust passageway of said internal combustion engine to an intake passageway thereof; and electronic control unit for arithmetically determining control quantities for said fuel injection means and said exhaust gas recirculation means, respectively, on the basis of detection information derived from outputs of said intake air flow sensing means and said crank angle sensing means, respectively;

wherein when fuel injection mode of said internal combustion engine is changed over from a compression-stroke fuel injection mode for realizing a high air-fuel ratio to a suction-stroke fuel injection mode for realizing a low air-fuel ratio, said electronic control unit changes control quantity for said exhaust gas recirculation means prior to the other control quantities for said suction-stroke fuel injection mode.

2. A fuel control system for a cylinder injection type internal combustion engine according to claim 1, wherein when said fuel injection mode is changed over from said compression-stroke fuel injection mode to said suction-stroke fuel injection mode, said electronic control unit changes the control quantity for said exhaust gas recirculation means prior to the other control quantities for said suction-stroke fuel injection mode by a preceding time period longer than a time lag involved in changing the control of the exhaust gas recirculation effectuated through said exhaust gas recirculation means.

3. A fuel control system for a cylinder injection type internal combustion engine according to claim 1, wherein when said internal combustion engine is operating in an idle operation range at a time point the fuel injection mode of said internal combustion engine is changed over from said compression-stroke fuel injection mode to said suction-stroke fuel injection mode, said electronic control unit sets a preceding time period for changing the control quantity for said exhaust gas recirculation means prior to the other control quantities for said suction-stroke fuel injection mode to be longer than in any other operation range.

4. A fuel control system for a cylinder injection type internal combustion engine according to claim 1, wherein when said internal combustion engine is operating in an accelerating operation range at a time point the fuel injection mode of said internal combustion engine is changed over from said compression-stroke fuel injection mode to said suction-stroke fuel injection mode, said electronic control unit sets a preceding time period for changing the control quantity for said exhaust gas recirculation means in precedence to other control quantities for said suction-stroke fuel injection mode to be shorter than in any other operation range.

5. A fuel control system for a cylinder injection type internal combustion engine according to claim 1, wherein upon changeover of the fuel injection mode of said internal combustion engine from said compression-stroke fuel injection mode to said suction-stroke fuel injection mode, said electronic control unit sets a preceding time period for changing control quantity for of said exhaust gas recirculation means to be variable as a function of the rotation speed (rpm) of said internal combustion engine.

6. A fuel control system for a cylinder injection type internal combustion engine according to claim 1, wherein upon changeover of the fuel injection mode of said internal combustion engine from said compression-stroke fuel injection mode to said suction-stroke fuel injection mode, said electronic control unit sets a preceding time period for changing control quantity for said exhaust gas recirculation means to be variable in dependence on rate of change in the rotation speed (rpm) of said internal combustion engine.

7. A fuel control system for a cylinder injection type internal combustion engine according to claim 6, wherein upon changeover of the fuel injection mode of said internal combustion engine from said compression-stroke fuel injection mode to said suction-stroke fuel injection mode, said electronic control unit sets a preceding time period for changing the control quantity for said exhaust gas recirculation means to be zero unless said rate of change in the rotation speed (rpm) of said internal combustion engine is lower than a predetermined value.

8. A method of controlling fuel injection in a cylinder injection type internal combustion engine, comprising the steps of:

detecting an intake air flow fed to said internal combustion engine;

detecting rotation speed (rpm) of said internal combustion engine and a crank angle thereof;

injecting fuel directly into each of said cylinders;

regulating quantity of exhaust gas recirculated from an exhaust passageway of said internal combustion engine to an intake passageway thereof; and determining arithmetically control quantities for said fuel injection and said exhaust gas recirculation on the basis of detected intake air flow and crank angle, respectively;

wherein when fuel injection mode of said internal combustion engine is changed over from a compression-stroke fuel injection mode for realizing a high air-fuel ratio to a suction-stroke fuel injection mode for realizing a low air-fuel ratio, said exhaust gas recirculation is controlled prior to any other control for said suction-stroke fuel injection mode.

9. A fuel injection control method for a cylinder injection type internal combustion engine according to claim 8, wherein when said fuel injection mode is changed over from said compression-stroke fuel injection mode to said suction-stroke fuel injection mode, control of said exhaust gas recirculation is changed prior to any other control for said suction-stroke fuel injection mode by a preceding time period longer than a time lag involved in changeover of the control of the exhaust gas recirculation.

10. A fuel injection control method for a cylinder injection type internal combustion engine according to claim 8, wherein when said internal combustion engine is operating in an idle operation range at a time point the fuel injection mode of said internal combustion engine is changed over from said compression-stroke fuel injection mode to said suction-stroke fuel injection mode, a preceding time period for changing over the control of said exhaust gas recirculation in precedence to other control for said suction-stroke fuel injection mode is set longer than that in any other operation range.

11. A fuel injection control method for a cylinder injection type internal combustion engine according to claim 8, wherein when said internal combustion engine is operating in an accelerating operation range at a time point the fuel injection mode of said internal combustion engine is changed over from said compression-stroke fuel injection mode to said suction-stroke fuel injection mode, a preceding time period for changing over the control of said exhaust gas recirculation prior to other control for said suction-stroke fuel injection mode is set shorter than that in any other operation range.

12. A fuel injection control method for a cylinder injection type internal combustion engine according to claim 8, wherein upon changeover of the fuel injection mode of said internal combustion engine from said compression-stroke fuel injection mode to said suction-stroke fuel injection mode, a preceding time period for the control of said exhaust gas recirculation is set to be variable as a function of the rotation speed (rpm) of said internal combustion engine.

13. A fuel injection control method for a cylinder injection type internal combustion engine according to claim 8, wherein upon changeover of the fuel injection mode of said internal combustion engine from said compression-stroke fuel injection mode to said suction-stroke fuel injection mode, a preceding time period for the control of said exhaust gas recirculation is set to be variable in dependence on a rate of change in the rotation speed (rpm) of said internal combustion engine.

14. A fuel injection control method for a cylinder injection type internal combustion engine according to claim 13, wherein upon changeover of the fuel injection mode of said internal combustion engine from said compression-stroke fuel injection mode to said suction-stroke fuel injection mode, a preceding time period for the control of said exhaust gas recirculation is set to be zero unless said rate of change in the rotation speed (rpm) of said internal combustion engine is lower than a predetermined value.

* * * * *